(12) United States Patent
Stiehl et al.

(10) Patent No.: US 8,590,665 B2
(45) Date of Patent: Nov. 26, 2013

(54) INVERTIBLE EAR TIPS FOR AN EAR PIECE

(71) Applicant: Apple Inc., Cupertino, CA (US)

(72) Inventors: Kurt Stiehl, Cupertino, CA (US);
Emery Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/735,807

(22) Filed: Jan. 7, 2013

(65) Prior Publication Data

US 2013/0118829 A1 May 16, 2013

Related U.S. Application Data

(63) Continuation of application No. 12/124,471, filed on May 21, 2008, now Pat. No. 8,348,010.

(60) Provisional application No. 60/999,660, filed on Oct. 19, 2007.

(51) Int. Cl.
*H04R 25/02* (2006.01)
*H04R 25/00* (2006.01)

(52) U.S. Cl.
USPC ............ 181/130; 181/135; 381/380; 381/328

(58) Field of Classification Search
USPC .................. 181/130, 129, 131, 135; 128/867; 381/380, 371, 328, 329
See application file for complete search history.

(56) References Cited

U.S. PATENT DOCUMENTS

| | | | |
|---|---|---|---|
| 2,803,308 | A | 8/1957 | DiMattia |
| 2,888,921 | A | 6/1959 | Nielson et al. |
| 3,303,902 | A | 2/1967 | Knott |
| 3,710,888 | A | 1/1973 | Peart |
| 3,935,401 | A | 1/1976 | Shore et al. |
| 4,607,720 | A | 8/1986 | Hardt |
| 4,852,684 | A | 8/1989 | Packard |
| 4,879,750 | A | 11/1989 | Nassler |
| 4,880,076 | A | 11/1989 | Ahlberg et al. |
| 4,972,488 | A | 11/1990 | Weiss et al. |
| 5,002,151 | A | 3/1991 | Oliveira et al. |
| 5,288,953 | A | 2/1994 | Peart |
| 5,401,920 | A | 3/1995 | Oliveira |
| 5,449,865 | A | 9/1995 | Desnick et al. |
| 5,824,968 | A | 10/1998 | Packard et al. |
| 5,988,313 | A | 11/1999 | Hakansson |

(Continued)

OTHER PUBLICATIONS

Office Action for U.S. Appl. No. 12/205,749, mailed Aug. 31, 2011.

(Continued)

*Primary Examiner* — Edgardo San Martin
(74) *Attorney, Agent, or Firm* — Van Court & Aldridge LLP

(57) ABSTRACT

An ear piece for providing audio (e.g., from an electronic device) to the user is provided. The ear piece may include a compliant element operative to be inserted in the user's ear such that the compliant element deforms to retain the ear piece in the user's ear. The compliant element may include a connector portion coupling the compliant element to the ear piece housing, and an outer portion folded over the ear piece housing. To improve the user's comfort, the parting lines and other manufacturing defects may be hidden from view and from touch (e.g., the parting lines are then on the inner surface of the outer portion).

22 Claims, 2 Drawing Sheets

(56) References Cited

U.S. PATENT DOCUMENTS

| | | |
|---|---|---|
| 6,129,174 A | 10/2000 | Brown et al. |
| 6,513,621 B1 | 2/2003 | Deslauriers et al. |
| 6,671,381 B1 | 12/2003 | Lux-Wellenhof |
| 6,860,362 B2 | 3/2005 | Saltykov |
| 6,938,622 B2 | 9/2005 | Huang |
| 7,349,550 B2 | 3/2008 | Oliveira et al. |
| 7,464,786 B2 | 12/2008 | Falco et al. |
| 7,548,629 B1 | 6/2009 | Griffin |
| 7,627,131 B2 | 12/2009 | Nielsen et al. |
| 8,189,846 B2 * | 5/2012 | Tiscareno et al. ............ 381/380 |
| 8,265,323 B2 * | 9/2012 | Stiehl et al. .................. 381/371 |
| 8,270,656 B2 * | 9/2012 | Stiehl et al. .................. 381/380 |
| 8,348,010 B2 * | 1/2013 | Stiehl et al. .................. 181/130 |
| 2002/0085728 A1 | 7/2002 | Shennib et al. |
| 2003/0051939 A1 | 3/2003 | Werblud |
| 2004/0062412 A1 | 4/2004 | Nassimi |
| 2005/0094835 A1 | 5/2005 | Doty |
| 2006/0147071 A1 | 7/2006 | Neilson |
| 2006/0171549 A1 | 8/2006 | Holmes |
| 2006/0180387 A1 | 8/2006 | Elliott |
| 2006/0233411 A1 | 10/2006 | Utigard |
| 2007/0189570 A1 | 8/2007 | Matsuo et al. |
| 2007/0201717 A1 | 8/2007 | Dyer et al. |
| 2007/0221232 A1 | 9/2007 | Jenkins, Jr. |
| 2007/0284182 A1 | 12/2007 | Mu |
| 2008/0013767 A1 | 1/2008 | Olsen et al. |
| 2008/0031481 A1 | 2/2008 | Warren |
| 2008/0187159 A1 | 8/2008 | Blanchard |
| 2008/0187161 A1 | 8/2008 | Tiemens et al. |
| 2008/0205679 A1 | 8/2008 | Darbut et al. |
| 2008/0240485 A1 | 10/2008 | Dyer et al. |
| 2008/0240486 A1 | 10/2008 | Garcia |
| 2009/0052711 A1 | 2/2009 | Murozaki |
| 2009/0101433 A1 | 4/2009 | Stiehl et al. |
| 2009/0103760 A1 | 4/2009 | Stiehl et al. |
| 2009/0103764 A1 | 4/2009 | Stiehl et al. |
| 2009/0136074 A1 | 5/2009 | Chang et al. |
| 2009/0233652 A1 | 9/2009 | Yang |
| 2009/0304220 A1 | 12/2009 | Fujikura et al. |

OTHER PUBLICATIONS

Final Office Action for U.S. Appl. No. 12/205,749, mailed Jan. 19, 2012.

Office Action for U.S. Appl. No. 12/205,748, mailed Aug. 31, 2011.

Final Office Action for U.S. Appl. No. 12/205,748, mailed Feb. 2, 2012.

Notice of Allowance for U.S. Appl. No. 12/205,748, mailed May 1, 2012.

Notice of Allowance for U.S. Appl. No. 12/794,690, mailed May 25, 2012.

Notice of Allowance for U.S. Appl. No. 12/205,749, mailed May 8, 2012.

* cited by examiner

INVERTIBLE EAR TIPS FOR AN EAR PIECE

CROSS-REFERENCE TO RELATED APPLICATION

This application is a continuation of U.S. patent application Ser. No. 12/124,471 (now U.S. Pat. No. 8,348,010), filed May 21, 2008, which claims the benefit of U.S. Provisional Patent Application No. 60/999,660, filed Oct. 19, 2007, both of which are incorporated herein in their entirety.

BACKGROUND OF THE INVENTION

Several different approaches can be used to provide audio from an electronic device to a user. For example, the electronic device may include or be coupled to a speaker or speaker system operative to provide audio. As another example, the electronic device may be coupled to a headset or headphone for providing audio directly to the user's ears. To improve a user's comfort, a headset or headphone may include one or more elements operative to provide a pleasant interface between the audio components of the headset (e.g., the ear piece) and the user's ears.

For example, some headsets may include an over-the-ear type ear piece that is operative to be placed on or over the user's ear. The ear piece may include one or more foam or cloth components that provide a compliant fit against the user's ear. As another example, some headsets may include an in-the-ear type ear piece (e.g., an earbud) operative to fit inside the user's ear. To provide a comfortable fit for the user, the ear piece may include a compliant outer portion operative to adjust to the shape of the user's ear, thus providing a firm and secure fit that remains comfortable. For example, the compliant outer portion may include a tubular structure coupled to the ear piece and forming a flexible structure surrounding the ear piece.

The compliant outer portion may be manufactured using any suitable approach. For example, it may be manufactured using a molding process. When using a molding process, however, a parting line is formed along the area of the outer surface where the material used for the surface is injected into the mold. The parting line creates a visual break in the outer surface and produces a physically detectable variation in the smoothness of the surface. This may be a source of discomfort to the user, and create a less visually pleasant ear piece.

SUMMARY OF THE INVENTION

A compliant outer portion coupled to an ear piece for use with an electronic device used to provide audio to a user is provided.

The ear piece may include one or more audio components operative to process signals received from the electronic device and generate an audio output for the user. The audio components may be coupled to the electronic device using any suitable approach, including for example wirelessly (e.g., using a Bluetooth or wireless protocol), or using a cable.

The ear piece may be operative to be placed in the user's ear. To improve the fit of the ear piece within the user's ear, the ear piece may be substantially surrounded by a compliant element. The compliant element may include a curved portion extending away from the ear piece such that the curved portion is placed in contact with the user's ear when the ear piece is inserted. In some embodiments, the compliant element may be larger than the user's ear such that the compliant element may elastically deform, creating an interference fit between the user's ear and the ear piece.

The compliant element may be manufactured using a molding process (e.g., an injection molding process). To eliminate the parting line on the surface of the compliant element that is in contact with the user's ear, the compliant element may be manufactured at least partially inverted. In other words, the compliant surface may be manufactured such that the parting line is along the inner surface of the curved portion. Then, once manufactured and inverted, the parting line will be located on the surface of the curved outer portion that faces towards the ear piece, and not towards the user's ear.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
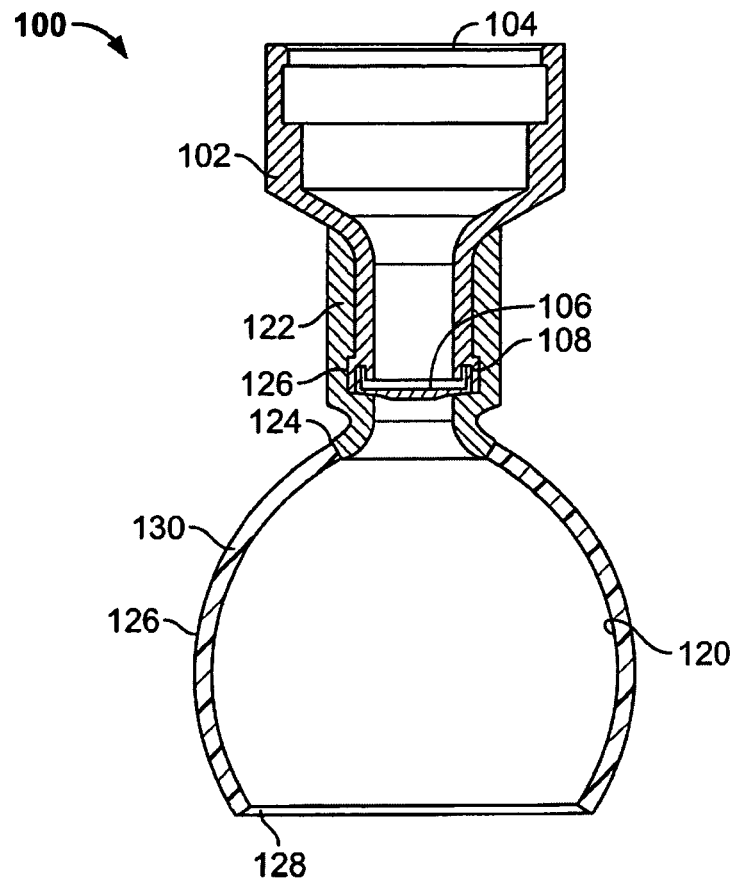
FIG. 1 is a cross-sectional view of an ear piece having an inverted compliant element in accordance with one embodiment of the invention.

FIG. 1 is a cross-sectional view of an ear piece having an inverted compliant element in accordance with one embodiment of the invention. Ear piece 100 may include base 102 housing the acoustic elements of ear piece 100. Base 102 may be shaped in any suitable manner, including for example in a substantially cylindrical shape (e.g., as the combination of several cylinders having different sizes). End 104 of base 102 may include one or more coupling elements for connecting base 102 to a second ear piece 100 (e.g., connecting the left and right ear pieces) or to an electronic device from which audio may be received (e.g., a coupling element including a cable). End 106 of base 102 may include an opening through which audio, processed and generated by audio components of ear piece 100, may be provided to the user. End 106 of base 102 may be sized such that end 106 may comfortably fit the user's ears. In some embodiments, end 106 may be substantially smaller than the user's ear to allow for an easy and comfortable fit.

End 106 may include ridge 108 extending from the periphery of base 102. For example, ridge 108 may be a cylinder having a slightly larger radius than the rest of end 106. As another example, ridge 108 may create a localized feature or pattern of features (e.g., a ridge that does not extend entirely around the periphery of base 102). Ridge 108 may be shaped in any suitable manner (e.g., have any suitable cross-section), and may include any suitable feature for engaging or coupling other elements of ear piece 100. For example, ridge 108 may have a triangular, rectangular, polygonal, circular, or oval cross-section. As another example, ridge 108 may include one or more engagement features, such as a hook, protrusion, overhang, or other feature operative to engage a corresponding feature in another component.

Base 102 may be constructed from any suitable material. In some embodiments, base 102 may be constructed from a material having sufficient rigidity and strength to protect the acoustic elements housed in base 102. For example, base 102 may be constructed from metal, plastic, a composite material, or any other suitable material (e.g., a hard material). In some embodiments, different portions of base 102 may be constructed with different materials, for example to improve the acoustic performance of ear piece 100 (e.g., end 104 may be constructed from a substantially plastic material, and end 106 may be constructed from a substantially metallic material). Because base 102 may be hard, base 102 may not be comfortable for the user. Accordingly, compliant element 120 may be coupled to base 102 to provide a comfortable interface between ear piece 100 and the user's ear.

Compliant element 120 may include coupling portion 122 and outer portion 130, which may be connected at interface 124. Coupling portion 122 may include a substantially cylindrical structure having open ends and operative to engage end 106 of base 102. For example, the inner surface of coupling portion 122 may include groove 126 placed opposite and operative to receive ridge 108. As another example, coupling portion 122 may include any other configuration corresponding to a feature of end 106 (e.g., an indentation for receiving a hook). In some embodiments, coupling portion 122 may be coupled to end 106 without using geometric or structural elements. For example, coupling portion 122 may be coupled to end 106 using an adhesive, tape, heat staking or heat treatment, an interference fit, a gasket, a mechanical fastener, combinations thereof, or any other suitable approach. In some embodiments, compliant element 120 may be manufactured as part of base 102 (e.g., molded into base 102, for example in a double-shot molding process).

Outer portion 130 may extend distally away from coupling portion 122 at interface 124 along the axis of coupling portion 122. Outer portion 130 may have any suitable shape, including for example a substantially curved cylindrical shape (e.g., having a variable circular or elliptical cross-section). To provide a comfortable fit all the way around end 106, outer portion 130 may form a tubular structure that extends entirely around the periphery of base 102. The shape and length of outer portion 130 may be selected based on the size of an average user's ear, such that outer portion 130 may deflect to receive the user's ear, thus providing an interference-type fit, but not deflect so much as to create significant pressure against the user's ear. For example, outer portion 130 may include a concave structure such that the diameter of outer portion 130 at interface 124 and tip 128 may be less than the diameter of outer portion at area 126 (e.g., where material is injected into a mold to form compliant element 120). Outer portion 130 may be substantially smooth for ease of manufacturing and to ensure a comfortable fit.

Compliant element 120 may be constructed from any suitable material. In some embodiments, coupling portion 122 and outer portion 130 may be constructed from different materials (e.g., in different colors for aesthetic reasons, for example coupling portion 122 may be white and outer portion 130 may be clear or substantially transparent or translucent). Any suitable material may be used for either portion of compliant element 120, including for example silicone, rubber, latex, foam, or any other suitable material. In some embodiments, compliant element 120 (or at least outer portion 130) may be manufactured from an elastic material (e.g., an elastomer or other composite material) operative to deform when ear piece 100 is placed in the user's ear such that compliant element 120 may expand and retain ear piece 100 comfortably in the user's ear. In some embodiments, the material used for compliant element 120 may be selected based on its acoustic properties (e.g., based on the material's acoustical absorption).

Compliant element 120 may be manufactured using any suitable approach. In some embodiments, compliant element 120 may be manufactured using a molding process. To easily create compliant element 120, material may be injected into the mold along an outermost portion of compliant element 120. In the example of FIG. 1, material may be injected at area 126 (e.g., a single line going around the periphery of compliant element 120, for example along the equator of outer portion 130). When the molding process is finished, and all of the material has been suitably inserted in the mold, a parting line remains at area 126. The parting line may be visible to the user's eye, and create a ridge or bump that is detectable by the user's finger (and may be uncomfortable in the user's ear). If other manufacturing techniques are used, outer portion 130 may include other defects or roughness inherent to the manufacturing, for example around area 126.

Figure 2:
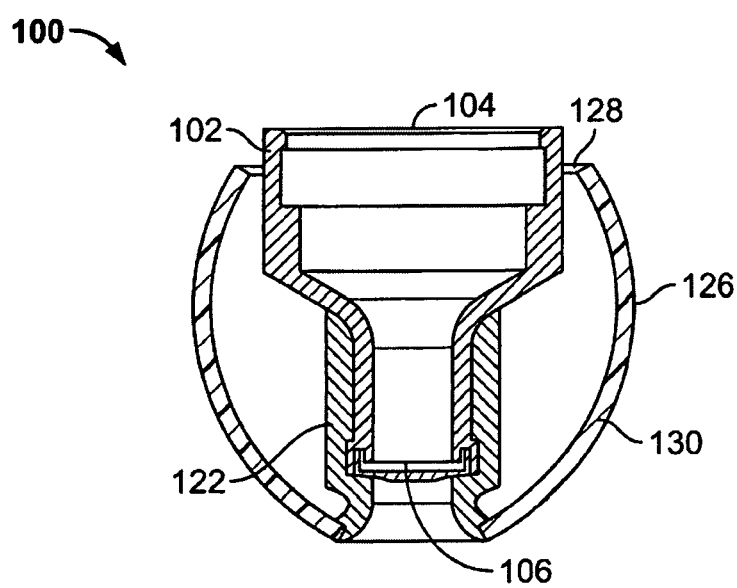
FIG. 2 is a cross-sectional view of the ear piece of FIG. 1 in which the compliant element is inverted back over the ear piece in accordance with one embodiment of the invention.

To hide the parting line of area 126 from the user and to make ear piece 100 more comfortable once inserted in the user's ear, compliant element 120 may be inverted. FIG. 2 is a cross-sectional view of the ear piece of FIG. 1 in which the compliant surface is inverted back over the ear piece in accordance with one embodiment of the invention. As shown in FIG. 2, outer portion 130 may be inverted over coupling portion 122 such that outer portion 130 is placed over the outer surface of base 102. Then, tip 128 may be closer to end 104 of housing 102 than interface 124 (e.g., contrary to prior to inversion, as shown in FIG. 1). Outer portion 130 may retain a concave shape to ensure the user's comfort as ear piece 100 is inserted in the user's ear.

Once outer portion 130 is inverted, the parting line at area 126 may be on the inner surface of outer portion 130 (e.g., away from the user's ear) such that the surface of outer portion 130 (e.g., the inner surface pre-inversion in FIG. 1) placed against the user's ear is substantially smooth. Using this inversion approach, the manufacturing defects or roughness may be hidden from view, thus providing the user with a more comfortable and more aesthetically pleasing product.

In some embodiments, compliant element 120, when manufactured in an inverted form (e.g., as in FIG. 1), may be shaped different than a compliant element manufactured directly in the final shape (e.g., as in FIG. 2), and subsequently inverted. In particular, it may not be possible to simply create a mold based on the inverted shape of a compliant element manufactured directly in the final shape due to stresses inherent to the material when it is shaped.

Figure 3:
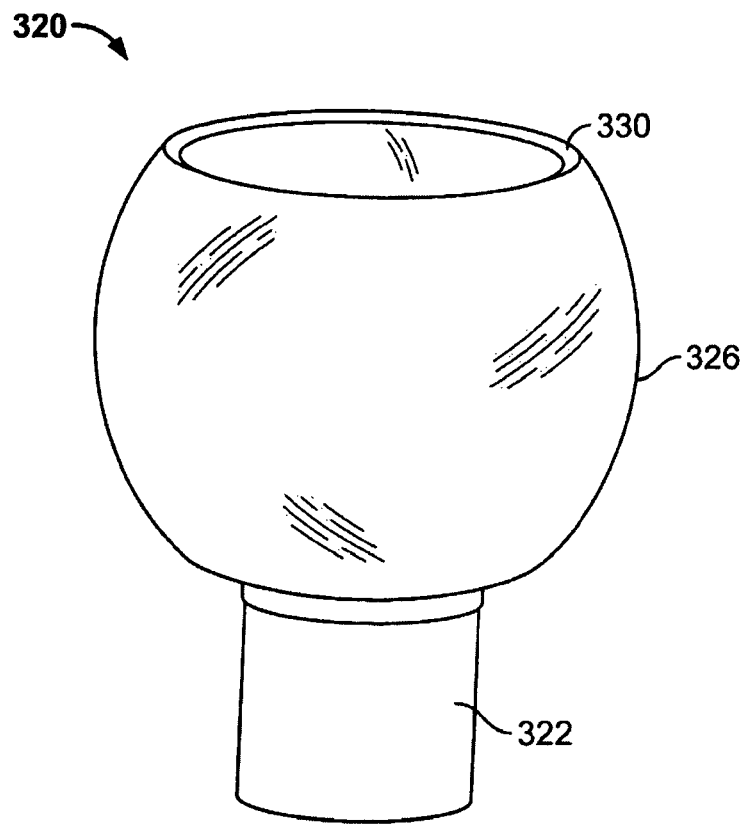
FIG. 3 is a schematic view of a compliant element for use with an ear piece as molded in accordance with one embodiment of the invention.

FIG. 3 is a schematic view of a compliant element for use with an ear piece as molded in accordance with one embodiment of the invention. Compliant element 320 may include coupling portion 322 and outer portion 330, which may include some or all of the features of portions of compliant element 120, described above. As shown in FIG. 3, parting line 326 may be located along the exposed surface of outer portion 330.

Figure 4:
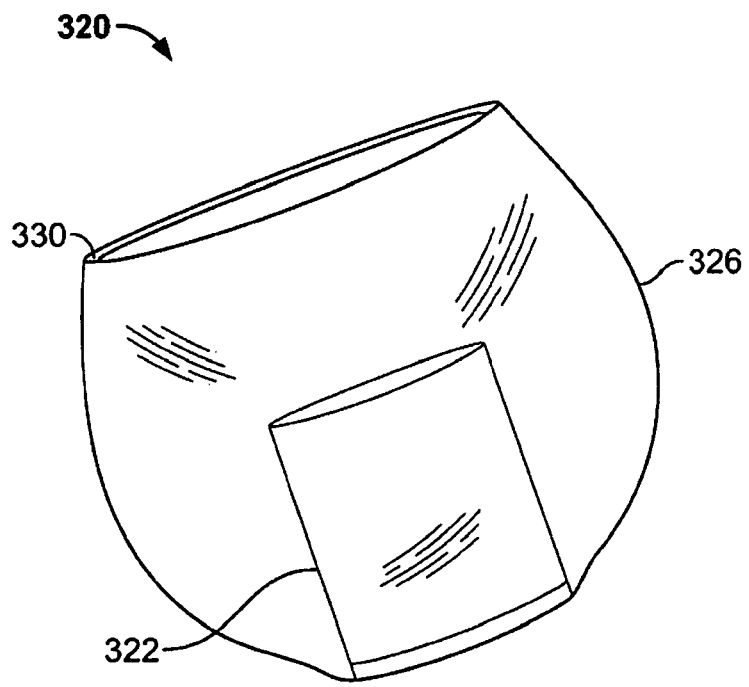
FIG. 4 is a schematic view of the compliant element of FIG. 3 once it has been inverted after molding in accordance with one embodiment of the invention.

FIG. 4 is a schematic view of the compliant element of FIG. 3 once it has been inverted after molding in accordance with one embodiment of the invention. As shown in FIG. 4, outer portion 330 of compliant element 320 may be inverted and folded back over coupling portion 322. Once inverted, parting line 326 may be on the surface of outer portion 330 that is adjacent coupling portion 322, and not adjacent the user's ear.

In some embodiments, other areas of the compliant element may be used to inject or provide material used to manufacture the compliant element. For example, with reference to FIG. 1, material may be injected at end 128 of outer portion 130, end 121 of coupling portion 122, or any other location of compliant element 120 that does not come into contact with the user's ear. In some embodiments, the location may be selected such that compliant element 120 can be manufactured directly in its final form (e.g., at end 128, FIG. 2).

The above described embodiments of the present invention are presented for purposes of illustration and not of limitation, and the present invention is limited only by the claims which follow.

What is claimed is:

1. An ear piece for providing audio to a user of an electronic device, the ear piece comprising:
    an ear piece housing;
    an inner ear-tip component coupled to an end of the ear piece housing, the inner ear-tip component comprising a first material; and
    an outer ear-tip component integrally formed with the inner ear-tip component, the outer ear-tip comprising a second material and the second material being less rigid than the first material, wherein a parting line on a surface of the outer ear-tip component faces towards the ear piece housing.

2. The ear piece of claim 1, wherein the outer ear-tip component comprises a curved cylindrical outer portion.

3. The ear piece of claim 1, the outer ear-tip component further comprising:
    a first portion extending away from the inner ear-tip component;
    a second portion comprising a fold; and
    a third portion extending towards the inner ear-tip component.

4. The ear piece of claim 3, wherein the outer ear-tip component is folded such that the third portion of the outer ear-tip component is placed adjacent the inner ear-tip component.

5. The ear piece of claim 1, wherein an engagement feature of the inner ear-tip component is coupled to a corresponding feature of the ear piece housing at the end of the ear piece housing.

6. The ear piece of claim 5, wherein the corresponding feature comprises at least one of a ridge, a hook, a protrusion, and an overhang.

7. The ear piece of claim 1, wherein the inner ear-tip component is coupled the ear piece housing at least one of an adhesive, tape, heat staking, an interference fit, a gasket, and a mechanical fastener.

8. The ear piece of claim 1, wherein the outer ear-tip component comprises at least one of silicone, rubber, latex, and foam.

9. An ear tip for a headphone, the ear tip comprising:
    an inner ear-tip component formed from a first material, the inner ear-tip component comprising a first end for coupling to a housing of the headphone; and
    an outer ear-tip component formed from a second material, the outer ear-tip component being integrally formed with a second end of the inner ear-tip at an interface, wherein a parting line from manufacturing the outer ear-tip component is located on a surface of the outer ear-tip component facing towards the inner ear-tip component, and wherein the first material is more rigid than the second material.

10. The ear tip of claim 9, wherein a diameter of the second end of the inner ear-tip component is smaller than a diameter of the first end of the inner ear-tip component.

11. The ear tip of claim 9, wherein the inner ear-tip component comprises an engagement feature for engaging a corresponding feature of the housing of the headphone.

12. The ear tip of claim 9, wherein the inner ear-tip component comprises a substantially cylindrical shape.

13. The ear tip of claim 9, wherein the outer ear-tip component comprises a curved cylindrical shape.

14. The ear tip of claim 13, wherein the curved cylindrical shape of the outer ear-tip component comprises one of a variable circular and an elliptical cross-section.

15. The ear tip of claim 9, wherein the outer ear-tip component is inverted such that the parting line faces the inner ear-tip component.

16. The ear tip of claim 15, wherein a surface of the outer ear-tip component facing away from the inner ear-tip component is smooth.

17. The ear tip of claim 9, wherein the outer ear-tip component deforms elastically when the ear tip is placed in a user's ear.

18. The ear tip of claim 9, wherein the outer ear-tip component is molded onto the inner ear-tip component.

19. A method for manufacturing an ear tip, the method comprising:
    inserting an inner ear-tip component comprising a first material into a mold;
    injecting a second material into the mold at an injection point to form an outer ear-tip component such that a parting line is created at the injection point and the inner ear-tip component and outer ear-tip component are molded together, wherein the first material is more rigid than the second material; and
    inverting the outer ear-tip component over the inner ear-tip component such that the parting line is located between the inner ear-tip component and the outer ear-tip component.

20. The method of claim 19, further comprising molding the inner ear-tip component before inserting the inner ear-tip component into the mold.

21. The method of claim 19, wherein the outer ear-tip component comprises a curved cylindrical shape.

22. The method of claim 19, wherein the inner ear-tip component comprises a substantially cylindrical shape.

* * * * *

UNITED STATES PATENT AND TRADEMARK OFFICE
CERTIFICATE OF CORRECTION

| | | |
|---|---|---|
| PATENT NO. | : 8,590,665 B2 | Page 1 of 1 |
| APPLICATION NO. | : 13/735807 | |
| DATED | : November 26, 2013 | |
| INVENTOR(S) | : Kurt Stiehl et al. | |

It is certified that error appears in the above-identified patent and that said Letters Patent is hereby corrected as shown below:

In the claims

In Column 5, Line 26, Claim 3, delete "claim 1, the" and insert -- claim 1, wherein the --, therefor.

In Column 5, Line 45, Claim 7, delete "housing at" and insert -- housing using at --, therefor.

Signed and Sealed this
Twenty-sixth Day of January, 2016

Michelle K. Lee
*Director of the United States Patent and Trademark Office*